US006943261B2

(12) United States Patent
Yan et al.

(10) Patent No.: US 6,943,261 B2
(45) Date of Patent: Sep. 13, 2005

(54) PROCESS FOR THE PRODUCTION OF CLA TRIGLYCERIDES

(75) Inventors: Youchun Yan, Wormerveer (NL); Ulrike Schmid, Wormerveer (NL); John Bernard Harris, Bedford (GB); Frederick William Cain, Wormerveer (NL)

(73) Assignee: Loders Croklaan USA LLC, Channahon, IL (US)

( * ) Notice: Subject to any disclaimer, the term of this patent is extended or adjusted under 35 U.S.C. 154(b) by 122 days.

(21) Appl. No.: 10/410,595

(22) Filed: Apr. 10, 2003

(65) Prior Publication Data

US 2003/0225295 A1 Dec. 4, 2003

(30) Foreign Application Priority Data

Apr. 12, 2002 (EP) .............................. 02252610

(51) Int. Cl.⁷ ................................. C11C 3/00
(52) U.S. Cl. ....................................... 554/168
(58) Field of Search ......................... 554/168

(56) References Cited

U.S. PATENT DOCUMENTS

| 3,792,041 A | 2/1974 | Yamagishi et al. ..... 260/234 R |
| 3,951,945 A | 4/1976 | Heesen et al. ........... 260/234 R |
| 3,963,699 A | 6/1976 | Rizzi et al. ............. 260/234 R |
| 4,517,360 A | 5/1985 | Volpenhein ............. 536/119 |

*Primary Examiner*—Deborah D. Carr
(74) *Attorney, Agent, or Firm*—Morgan, Lewis & Bockius LLP

(57) ABSTRACT

The invention concerns a novel process for the production of glycerol esters of polyunsaturated fatty acids, in particular of C18:2 conjugated fatty acids, by converting the polyunsaturated fatty acids with glycerol in the presence of a mixed catalyst comprising a combination of a food grade salt of a strong base and a weak acid and a soap of an organic acid with 2–26 C-atoms, preferably 10–20 C-atoms.

23 Claims, No Drawings

PROCESS FOR THE PRODUCTION OF CLA TRIGLYCERIDES

Glycerol esters of polyunsaturated fatty acids are known materials. Examples thereof can be found in nature e.g. in fish oils these esters are often present in limited amounts. However it also disclosed in the prior art that these esters can be made from glycerol and free fatty acids. In this processing enzymes are applied as catalysts. Although enzymes have a number of advantages over chemical compounds as a catalyst they also have a number of disadvantages such as the use of enzymes require a careful control of the water content of the reaction system because too high water content will prevent an esterification. This control of water content however is not always easy and complicates the enzymic conversion. Moreover the products of the enzymic conversion often contain polymeric isomers of the polyunsaturated products while also unwanted geometric isomers (i.e. cis/trans isomers) are formed in undesirable too high amounts.

Therefore we studied whether we could find another route for the production of glycerol esters from conjugated polyunsaturated fatty acids. We found this route, which avoids all the disadvantages mentioned above and which is based on the use of a chemical catalytic system in the form of a combination of a salt of a weak acid and a strong base and a soap.

Although trans esterification reactions of glycerol with saturated fatty acid alkyl esters using e.g. sodium carbonate as catalyst are known (cf U.S. Pat. No. 5,254,722) while also esterification of glycerol with fatty acids are known using a soap as catalyst (cf Szelag c.s in Fett Lipid 100 (7) 302–307 July 1998) we found that when applying these systems to polyunsaturated fatty acid a problem occurred i.e. since polyunsaturated fatty acids are very heat-sensitive, the reaction temperatures used were so high that the polyunsaturated fatty acids were already destroyed during the esterification. Moreover when the reaction was carried out at low temperature ($\leq 140°$ C.), the initial reaction rate was so slow that the reaction could not be started in the beginning. Unexpectedly we found that this problem could be overcome when a combination of a salt of a weak acid and a strong base and a soap was applied.

Therefore our invention concerns in the first instance a process for the production of glycerol esters of conjugated polyunsaturated fatty acids with 18 to 24 carbon atoms and 2 to 5 double bonds, in particular of C18:2 conjugated fatty acids, by converting the conjugated polyunsaturated fatty acids with glycerol in the presence of a mixed catalyst comprising a combination of a food grade salt of a strong base and a weak acid and a soap of an organic acid with 2–26 C-atoms, preferably 10–20 C-atoms.

By applying this combined catalyst a very mild and still robust process for the production of glycerol esters of conjugated polyunsaturated fatty acids was obtained with which high yields of esters were achievable while the reaction product hardly contained undesirable isomers of the conjugated polyunsaturated fatty acids nor polymers therefrom. This reaction system further did not require a careful control of the water content of the reaction system and thus was easy to perform.

The ratio soap to conjugated polyunsaturated fatty acid that can be applied is very broad but the best results were obtained when using weight ratios of the soap to the conjugated polyunsaturated fatty acids of between 0.01:1 and 0.6:1, preferably between 0.02:1 and 0.15:1.

Similarly the weight ratio food grade salt to soap also could vary considerably although we prefer to apply a weight ratio of the food grade salt to the soap of between 0.005:1 and 0.6:1, preferably between 0.02:1 and 0.1:1.

The best mixed catalyst are those wherein the food grade salt is derived from a strong base selected from the group consisting of potassium hydroxide, sodium hydroxide, ammonium hydroxide and a weak acid selected from the group consisting of carbonic acid, acetic acid, phosphoric acid, in particular salts selected from the group consisting of alkali metal carbonate, hydrogencarbonates, acetates and phosphates and most preferrably potassium salts from carbonates or hydrogencarbonates.

The soaps also can be selected from a wide range of soaps, but very suitable results were obtained when applying soaps selected from the group consisting of sodium and potassium soaps of saturated and/or unsaturated fatty acids, in particular soaps derived from palmitic acid and stearic acid are useful because they are easily available and cheap. However we prefer to use a soap of a fatty acid that is used for the conversion of the glycerol. So if CLA-triglycerides are made the best soap used is a soap from conjugated linoleic acid. In this way the product from the reaction is not contaminated by trace amounts of fatty acids present in the soap. The soaps so used can be made in situ by mixing first the free fatty acid and the required base and then adding the glycerol and the food grade salt to the system.

The process performs smoothly at relatively low temperatures of less than 175° C., preferably between 100 and 140° C.

Good results are obtained when applying molar ratios of glycerol to conjugated polyunsaturated fatty acids of between 1:1 to 1:15, preferably between 1:3 to 1:9.

Our complete process can thus be performed by i) Making a soap solution of a fatty acid by stirring of a solution of a mixture of a fatty acid and a base such as potassium hydroxide or sodium hydroxide at about 80° C.;

ii) Concentrating the soap solution by eliminating water under vacuum;

iii) Adding a food grade salt of a strong base and a weak acid, as well as glycerol and conjugated polyunsaturated fatty acid with 18 to 24 carbon atoms and 2 to 5 double bonds to the soap solution and heating the mixture progressively to a temperature from 60° C. to 150° C. at less than atmospheric pressure for 0.5~5 days iv) cooling of the reaction mixture obtained to 50~60° C.;

v) adding concentrated strong acids, such as H2SO4 or HCl to convert the soap to fatty acid;

vi) removing free fatty acids left by short path distillation.

According to another embodiment of our invention we also claim our novel catalytic system which system comprises a food grade salt of a strong base, preferably NaOH or KOH and a weak acid, preferably carbonic acid and a soap of a conjugated fatty acid with 18 to 24 carbon atoms and 2 to 5 double bonds, preferably CLA in weight ratio of 0.01:1 to 0.6:1 (soap to conjugated fatty acid).

EXAMPLES

Example 1

The esterification reaction was carried out in a 3-necked 500 ml flask, equipped with a thermometer, stirrer and an adapter for vacuum and nitrogen. 280 g CLA, 15 g CLA sodium soap, 23 g glycerol and 0.6 g potassium carbonate were placed in the flask (ratio of soap to CLA of 0.05:1; ratio of potassium carbonate to soap of 0.04:1). After stirring for 30 min at 80° C. to dissolve the soap in the reaction system, a zero-sample was taken. Then the reaction mixture were heated at 110° C./100–150 mbar to start the reaction. The temperature was maintained at 110–130° C. by a heating oil bath and the mixture was stirred for about three days. The nitrogen flow and vacuum were used to remove reaction water to force the equilibrium to synthesis direction. The reaction was terminated by releasing the vacuum and cooling to room temperature. The mixture was analyzed by HPLC and the results were presented in Table 1.

TABLE 1

Results for example 1

| Component name | Content (%) |
|---|---|
| FFA | 27.2 |
| triglyceride | 52.2 |
| diglyceride | 14.4 |
| monoglyceride | 0.3 |
| polymer | 1.3 |
| others | 4.6 |
| FAME composition of the product | |
| C14:0 | 0.1 |
| C16:0 | 4.0 |
| C16:1 | 0.1 |
| C17:0 | 0 |
| C18:0 | 1.1 |
| C18:1, c9 | 11.7 |
| C18:1, t9 | 0 |
| C18:2, c9,c11 | 0.8 |
| C18:2, c9,t11 | 39.2 |
| C18:2, c9,c12 | 0.8 |
| C18:2, t9,t11 | 1.4 |
| C18:2, t9,t12 | 0.7 |
| C18:2, c10,c12 | 0.8 |
| C18:2, t10,c12 | 37.6 |
| C18:2, c11,c13 | 1.5 |
| C18:2 oxide | 0.2 |
| C20:0 | 0.1 |
| C20:1 | 0.1 |

Example 2, 3, 4

The procedure used for Example 1 was repeated using exactly the same conditions except that the reaction was performed without potassium carbonate (Example 2) or without CLA sodium soap (Example 3) or using lauric acid sodium soap instead of CLA sodium soap (Example 4). After stopping the reaction, the reaction mixtures were analyzed and the results are shown in Table 2, 3 and 4.

TABLE 2

Results for example 2

| Component name | Content (%) |
|---|---|
| FFA | 37.6 |
| triglyceride | 24.2 |
| diglyceride | 29.7 |
| monoglyceride | 2.7 |
| polymer | 1.5 |
| others | 4.3 |
| FAME composition of the product | |
| C14:0 | 0.1 |
| C16:0 | 4.6 |
| C16:1 | 0.1 |
| C17:0 | 0 |
| C18:0 | 1.7 |
| C18:1, c9 | 11 |
| C18:1, t9 | 0 |

TABLE 2-continued

Results for example 2

| Component name | Content (%) |
|---|---|
| C18:2, c9,c11 | 0.8 |
| C18:2, c9,t11 | 38.1 |
| C18:2, c9,c12 | 0.8 |
| C18:2, t9,t11 | 1.1 |
| C18:2, t9,t12 | 0.6 |
| C18:2, c10,c12 | 0.8 |
| C18:2, t10,c12 | 38.9 |
| C18:2, c11,c13 | 1.1 |
| C18:2 oxide | 0.2 |
| C20:0 | 0.1 |
| C20:1 | 0.1 |

TABLE 3

Results for example 3

| Component name | Content (%) |
|---|---|
| FFA | 40.6 |
| triglyceride | 23.1 |
| diglyceride | 31 |
| monoglyceride | 4 |
| polymer | 1.3 |
| others | 0 |
| FAME composition of the product | |
| C14:0 | 0.1 |
| C16:0 | 4.4 |
| C16:1 | 0.1 |
| C17:0 | 0 |
| C18:0 | 1.7 |
| C18:1, c9 | 10.5 |
| C18:1, t9 | 0 |
| C18:2, c9,c11 | 0.7 |
| C18:2, c9,t11 | 36.5 |
| C18:2, c9,c12 | 0.8 |
| C18:2, t9,t11 | 0.6 |
| C18:2, t9,t12 | 0.8 |
| C18:2, c10,c12 | 0.8 |
| C18:2, t10,c12 | 37.3 |
| C18:2, c11,c13 | 1.1 |
| C18:2 oxide | 0.1 |
| C20:0 | 0.1 |
| C20:1 | 0.1 |

TABLE 4

Results for example 4

| Component name | Content (%) |
|---|---|
| FFA | 29.3 |
| triglyceride | 49.3 |
| diglyceride | 17.2 |
| monoglyceride | 0.8 |
| polymer | 2.2 |
| others | 1.2 |
| FAME composition of the product | |
| C12:0 | 4.5 |
| C14:0 | 0.1 |
| C16:0 | 4.4 |
| C16:1 | 0.1 |
| C17:0 | 0 |
| C18:0 | 1.6 |
| C18:1, c9 | 10.6 |
| C18:1, t9 | 0 |
| C18:2, c9,c11 | 0.7 |

TABLE 4-continued

Results for example 4

| Component name | Content (%) |
|---|---|
| C18:2, c9,t11 | 36.3 |
| C18:2, c9,c12 | 0.7 |
| C18:2, t9,t11 | 1.2 |
| C18:2, t9,t12 | 0.6 |
| C18:2, c10,c12 | 0.7 |
| C18:2, t10,c12 | 36.8 |
| C18:2, c11,c13 | 1.3 |
| C18:2 oxide | 0.2 |
| C20:0 | 0.1 |
| C20:1 | 0 |

Conclusions

| Reaction systems | Triglyceride (%) | Comments |
|---|---|---|
| potassium carbonate + CLA soap | 52.2 | High levels of TG |
| potassium carbonate | 23.1 | Relative low levels of TG |
| CLA soap | 24.2 | Relative low levels of TG |
| potassium carbonate + lauric acid soap | 49.3 | High levels of TG, but high content of saturated C12:0 |

Example 5, 6

The procedure of Example 1 was repeated using exactly the same conditions except that the reaction was performed only with 30 g CLA sodium soap (Example 5) or only with 1.2 g potassium carbonate (Example 6). After the reaction, the reaction mixtures were analyzed and the results were shown in Table 5 and Table 6.

TABLE 5

Results for example 5

| Component name | Content (%) |
|---|---|
| FFA | 35.5 |
| triglyceride | 25.1 |
| diglyceride | 28 |
| monoglyceride | 0.9 |
| polymer | 1.3 |
| others | 9.2 |
| FAME composition of the product | |
| C14:0 | 0.1 |
| C16:0 | 4.5 |
| C16:1 | 0.1 |
| C17:0 | 0 |
| C18:0 | 1.7 |
| C18:1, c9 | 10.8 |
| C18:1, t9 | 0 |
| C18:2, c9,c11 | 0.8 |
| C18:2, c9,t11 | 38 |
| C18:2, c9,c12 | 0.8 |
| C18:2, t9,t11 | 0.6 |
| C18:2, t9,t12 | 0.6 |
| C18:2, c10,c12 | 0.8 |
| C18:2, t10,c12 | 39.2 |
| C18:2, c11,c13 | 1.0 |
| C18:2 oxide | 0.2 |

TABLE 5-continued

Results for example 5

| Component name | Content (%) |
|---|---|
| C20:0 | 0.1 |
| C20:1 | 0.1 |

TABLE 6

Results for example 6

| Component name | Content (%) |
|---|---|
| FFA | 39.8 |
| triglyceride | 23.9 |
| diglyceride | 29.9 |
| monoglyceride | 4.2 |
| polymer | 2.3 |
| others | 0.1 |
| FAME composition of the product | |
| C14:0 | 0.1 |
| C16:0 | 4.8 |
| C16:1 | 0.1 |
| C17:0 | 0.1 |
| C18:0 | 1.8 |
| C18:1, c9 | 11.5 |
| C18:1, t9 | 0 |
| C18:2, c9,c11 | 0.8 |
| C18:2, c9,t11 | 37.2 |
| C18:2, c9,c12 | 0.7 |
| C18:2, t9,t11 | 0.5 |
| C18:2, t9,t12 | 0.7 |
| C18:2, c10,c12 | 0.9 |
| C18:2, t10,c12 | 37.8 |
| C18:2, c11,c13 | 1.6 |
| C18:2 oxide | 0.2 |
| C20:0 | 0.1 |
| C20:1 | 0.1 |

Example 7

The procedure of Example 1 was repeated using exactly the same conditions except that the reaction was performed using 0.6 g sodium carbonate instead of potassium carbonate. After the reaction, the reaction mixture was analyzed and the results were shown in Table 7.

TABLE 7

Results for example 7

| Component name | Content (%) |
|---|---|
| FFA | 33 |
| triglyceride | 40.6 |
| diglyceride | 24.2 |
| monoglyceride | 1.5 |
| polymer | 2.4 |
| others | 0.2 |
| FAME composition of the product | |
| C14:0 | 0.1 |
| C16:0 | 4.6 |
| C16:1 | 0.1 |
| C17:0 | 0.0 |
| C18:0 | 1.7 |
| C18:1, c9 | 10.9 |
| C18:1, t9 | 0 |
| C18:2, c9,c11 | 0.9 |
| C18:2, c9,t11 | 37.8 |

TABLE 7-continued

Results for example 7

| Component name | Content (%) |
|---|---|
| C18:2, c9,c12 | 0.7 |
| C18:2, t9,t11 | 0.5 |
| C18:2, t9,t12 | 0.6 |
| C18:2, c10,c12 | 0.9 |
| C18:2, t10,c12 | 38.5 |
| C18:2, c11,c13 | 1.2 |
| C18:2 oxide | 0.4 |
| C20:0 | 0.1 |
| C20:1 | 0.1 |

What is claimed is:

1. Process for the production of glycerol esters of conjugated polyunsaturated fatty acids with 18 to 24 carbon atoms and 2 to 5 double bonds by converting the conjugated polyunsaturated fatty acids with glycerol in the presence of a mixed catalyst comprising a combination of a food grade salt of a strong base and a weak acid and a soap of an organic acid with 2–26 C-atoms.

2. Process according to claim 1 wherein the weight ratio of the soap to the conjugated polyunsaturated fatty acids is between 0.01:1 and 0.6:1.

3. Process according to claim 1 or 2 wherein the weight ratio of the food grade salt to the soap is between 0.005:1 and 0.6:1.

4. Process according to claim 1 or 2 wherein the mixed catalyst comprises a food grade salt derived from a strong base selected from the group consisting of potassium hydroxide, sodium hydroxide, ammonium hydroxide and a weak acid selected from the group consisting of carbonic acid, acetic acid, phosphoric acid.

5. Process according to claims 1 or 2, wherein the soap is selected from the group consisting of sodium and potassium soaps of saturated and/or unsaturated fatty acids.

6. Process according to claim 1 wherein the process is carried out at a temperature of less than 175° C.

7. Process according to claim 1 wherein a molar ratio of glycerol to conjugated polyunsaturated fatty acids of between 1:1 to 1:15 is applied.

8. Process according to claim 1 wherein the soap is derived from the fatty acid applied for the conversion of the glycerol.

9. Process for the preparation of glycerol fatty acids from conjugated polyunsaturated fatty acids with 18 to 24 carbon atoms and 2 to 5 double bonds involving the steps of:
i) making a soap solution of a fatty acid by stirring of a solution of a mixture of a fatty acid and a base at 80° C.;
ii) concentrating the soap solution by eliminating water under vacuum;
iii) adding a food grade salt of a strong base and a weak acid, as well as glycerol and a conjugated polyunsaturated fatty acid with 18 to 24 carbon atoms and 2 to 5 double bonds to the soap solution and heating the mixture progressively to a temperature from 60° C. to 150° C. at less than atmospheric pressure for 0.5–5 days;
iv) cooling of the reaction mixture obtained to 50–60° C.;
v) adding concentrated strong acid to convert the soap to fatty acid;
vi) removing free fatty acids left by short path distillation.

10. Catalytic system comprising a food grade salt of a strong base, and a weak acid, and a soap of a conjugated fatty acid with 18–24 C-atoms and 2 to 5 double bonds, in weight ratio of 0.01:1 to 0.6:1 [–] soap to conjugated fatty acid.

11. The process according to claim 1, wherein the polyunsaturated fatty acids are C18:2 conjugated fatty acids.

12. The process according to claim 1, wherein the soap is a soap of an organic acid with 10–20 C-atoms.

13. The process according to claim 1, wherein the weight ratio of the soap to the conjugated polyunsaturated fatty acids is between 0.02:1 and 0.15:1.

14. The process according to claim 1 or 2, wherein the weight ratio of the food grade salt to the soap is between 0.02:1 and 0.1:1.

15. The process according to claim 1 or 2, wherein the mixed catalyst comprises a food grade salt selected from the group consisting or alkali metal carbonate, hydrogencarbonates, acetates and phosphate.

16. The process according to claim 1 or 2, wherein the mixed catalyst comprises a food grade salt selected from the group consisting of sodium or potassium salts from carbonates or hydrogencarbonates.

17. The process according to claim 1, wherein the process is carried out at a temperature of between 100 and 140°C.

18. The process according to claim 1, wherein a molar ratio of glycerol to conjugated polyunsaturated fatty acids of between 1:3 to 1:9 is applied.

19. The process according to claim 9, wherein the base is potassium hydroxide or sodium hydroxide.

20. The process according to claim 9, wherein the strong acid is $H_2SO_4$ or HCl.

21. The catalytic system according to claim 10, wherein the strong base is NaOH or KOH.

22. The catalytic system according to claim 10, wherein the weak acid is carbonic acid.

23. The catalytic system according to claim 10, wherein the conjugated fatty acid is conjugated linoleic acid.

* * * * *